(12) United States Patent
Bolin et al.

(10) Patent No.: US 11,447,228 B2
(45) Date of Patent: Sep. 20, 2022

(54) METHODS OF MANUFACTURE FOR AIRCRAFT SUBSTRUCTURE

(71) Applicant: THE BOEING COMPANY, Chicago, IL (US)

(72) Inventors: Jared L. Bolin, Millstadt, IL (US); Christopher Tyler, Saint Peters, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/856,573

(22) Filed: Apr. 23, 2020

(65) Prior Publication Data

US 2021/0331779 A1  Oct. 28, 2021

(51) Int. Cl.
*B64C 1/06* (2006.01)
*B64F 5/10* (2017.01)
*B64C 1/00* (2006.01)

(52) U.S. Cl.
CPC .............. *B64C 1/061* (2013.01); *B64F 5/10* (2017.01); *B64C 2001/0081* (2013.01)

(58) Field of Classification Search
CPC ........ B64C 1/061; B21D 28/02; B21D 24/16; B21D 22/208; B21D 35/001; B21D 26/055; B23P 2700/01
See application file for complete search history.

(56) References Cited

U.S. PATENT DOCUMENTS

| | | | | |
|---|---|---|---|---|
| 4,678,226 A * | 7/1987 | Ishizuka | ............... | B61D 1/04 |
| | | | | 244/119 |
| 7,210,611 B2 * | 5/2007 | Sanders | ............... | B21D 26/055 |
| | | | | 228/112.1 |
| 7,757,534 B2 * | 7/2010 | Shiga | ................... | B21D 19/088 |
| | | | | 72/332 |
| 7,837,808 B2 * | 11/2010 | Heymes | .................... | C22F 1/04 |
| | | | | 148/417 |
| 8,656,750 B2 | 2/2014 | Horton et al. | | |
| 9,205,922 B1 | 12/2015 | Bouwer | | |
| 10,384,251 B2 * | 8/2019 | Isogai | ................... | B21D 28/26 |
| 10,443,109 B2 | 10/2019 | Gomez | | |
| 10,457,997 B2 * | 10/2019 | Singh | ................... | B21D 22/022 |
| 10,640,235 B2 * | 5/2020 | Sanderson | ............... | B64F 5/10 |
| 10,682,902 B2 * | 6/2020 | Otsuka | .................... | B21D 22/20 |
| 10,766,626 B2 * | 9/2020 | Leon | ......................... | C21D 1/18 |
| 10,946,427 B2 * | 3/2021 | Miyagi | .................. | B21D 22/22 |
| 11,000,890 B2 * | 5/2021 | Otsuka | .................... | B21D 22/22 |

(Continued)

FOREIGN PATENT DOCUMENTS

GB        2587002 A  *  2/2019
WO   WO-2017060697 A1  *  4/2017   ........... B21D 35/002

*Primary Examiner* — David P Bryant
*Assistant Examiner* — Michael W Hotchkiss
(74) *Attorney, Agent, or Firm* — The Small Patent Law Group LLC; Joseph M Butscher

(57) ABSTRACT

A method includes providing a frame sheet. The method also includes elevating a temperature of the frame sheet to at or above an elevated target temperature. Further the method includes, at or above the elevated target temperature, forming the frame sheet to provide a frame defining a web and at least one flange. Also, the method includes machining at least one of the web or the at least one flange to reduce a thickness of the at least one of the web or the at least on flange.

21 Claims, 7 Drawing Sheets

(56) References Cited

U.S. PATENT DOCUMENTS

| | | | |
|---|---|---|---|
| 2006/0086774 A1* | 4/2006 | Sanders | B23K 20/122 |
| | | | 228/112.1 |
| 2006/0237587 A1* | 10/2006 | Luttig | B64C 1/061 |
| | | | 244/119 |
| 2007/0210211 A1* | 9/2007 | Grob | B64C 1/10 |
| | | | 244/119 |
| 2008/0280156 A1* | 11/2008 | Eilert | B29C 43/10 |
| | | | 428/542.8 |
| 2011/0159242 A1* | 6/2011 | Arevalo Rodr Guez | |
| | | | B29D 99/0003 |
| | | | 428/157 |
| 2014/0027573 A1* | 1/2014 | Cazeneuve | B64C 1/061 |
| | | | 244/119 |
| 2014/0238096 A1* | 8/2014 | Golovashchenko | B23D 15/14 |
| | | | 72/55 |
| 2016/0222485 A1* | 8/2016 | Murakami | C22C 38/18 |
| 2016/0229530 A1* | 8/2016 | Welsh | A63H 27/12 |
| 2017/0036781 A1* | 2/2017 | Sanderson | G05B 19/4099 |
| 2018/0001368 A1* | 1/2018 | Otsuka | B60J 5/04 |
| 2019/0241987 A1 | 8/2019 | Sohmshetty et al. | |
| 2020/0047867 A1* | 2/2020 | Griess | B64C 1/061 |
| 2020/0230682 A1* | 7/2020 | Matsuno | B21D 28/34 |
| 2020/0353556 A1* | 11/2020 | Leon | C22C 21/00 |

* cited by examiner

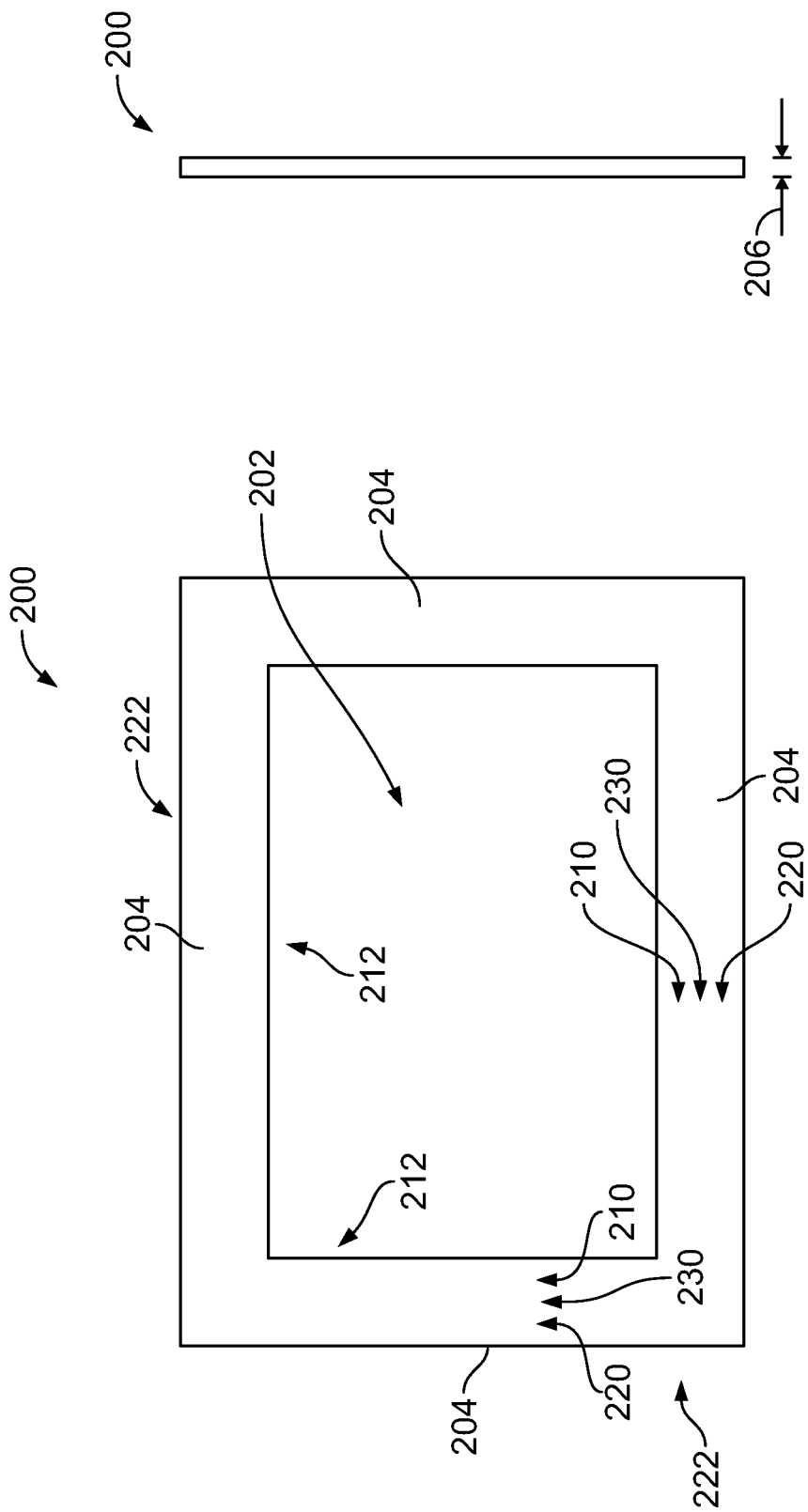

METHODS OF MANUFACTURE FOR AIRCRAFT SUBSTRUCTURE

FIELD OF EMBODIMENTS OF THE DISCLOSURE

Embodiments of the present disclosure generally relate to methods of providing frames such as, for example, substructure frames for aircraft.

BACKGROUND OF THE DISCLOSURE

It is desirable to have structural components of aircraft that provide sufficient strength while still minimizing weight. For example, frames may have a beam or channel shaped cross-section that extends along a perimeter. Conventionally, certain substructure frames (e.g., for unmanned aerial vehicles) is machined from a solid plate. Machining such channel shaped cross sections results in a relatively large amount of waste material. Additionally, the amount of machining required results in relatively higher processing time and expense.

SUMMARY OF THE DISCLOSURE

A need exists for improved manufacture of frames, for example substructure frames for aircraft, which reduce material waste and/or processing time.

With those needs in mind, certain embodiments of the present disclosure provide improved frames for aircraft. In various embodiments, a metallic (e.g., alloy) frame is hot stamped to form a frame having a channel-shaped cross-section. For example, the frame may be generally rectangular and have a channel defined by a web extending between flanges on opposite sides of the web. After forming, the frame is machined to reduce the thickness of the web and flanges to desired predetermined values. Compared to existing methods of machining frames from thick plates, various embodiments utilize substantially thinner pieces of metal and reduce material waste and machining time.

Certain embodiments of the present disclosure provide a method that includes providing a frame sheet. The method also includes elevating a temperature of the frame sheet to an elevated target temperature. Further the method includes, at the elevated target temperature, forming the frame sheet to provide a frame defining a web and at least one flange. Also, the method includes machining at least one of the web or the at least one flange to reduce a thickness of the at least one of the web or the at least on flange.

Certain embodiments of the present disclosure provide a method that includes providing a plurality of frames. Providing each frame includes providing a frame sheet, elevating a temperature of the frame sheet to an elevated target temperature, forming, at the elevated target temperature, the frame sheet to provide a frame defining a web and at least one flange, and machining at least one of the web or the at least one flange to reduce a thickness of the at least one of the web or the at least on flange. The method also includes joining the plurality of frames to form an aircraft substructure.

BRIEF DESCRIPTION OF THE DRAWINGS

FIG. 2 depicts a plan view of a frame sheet, according to an embodiment of the present disclosure.

FIG. 3 depicts a side view of the frame sheet of FIG. 2.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide methods for providing frames that are formed from frame sheets, and then machined to a desired shape and/or size. In various embodiments, a relatively thin flat frame sheet is heated, and then formed, in a die (e.g., using a press), into a frame having a channel-shaped cross-section while being quenched. A number of such frames may be used to provide a frame assembly (e.g., a frame substructure for an aircraft such as an unmanned aerial vehicle (UAV), helicopter, or airplane). By utilizing heating and forming as discussed herein, various embodiments provide improved accuracy in formation of frames, improved structural properties of material used for frames, reduced machining time, and/or reduced wasted material (e.g., relative to conventional aircraft manufacturing approaches in which a frame structure (e.g., a frame structure for a UAV) is entirely machined from a relatively thick plate).

Figure 1:
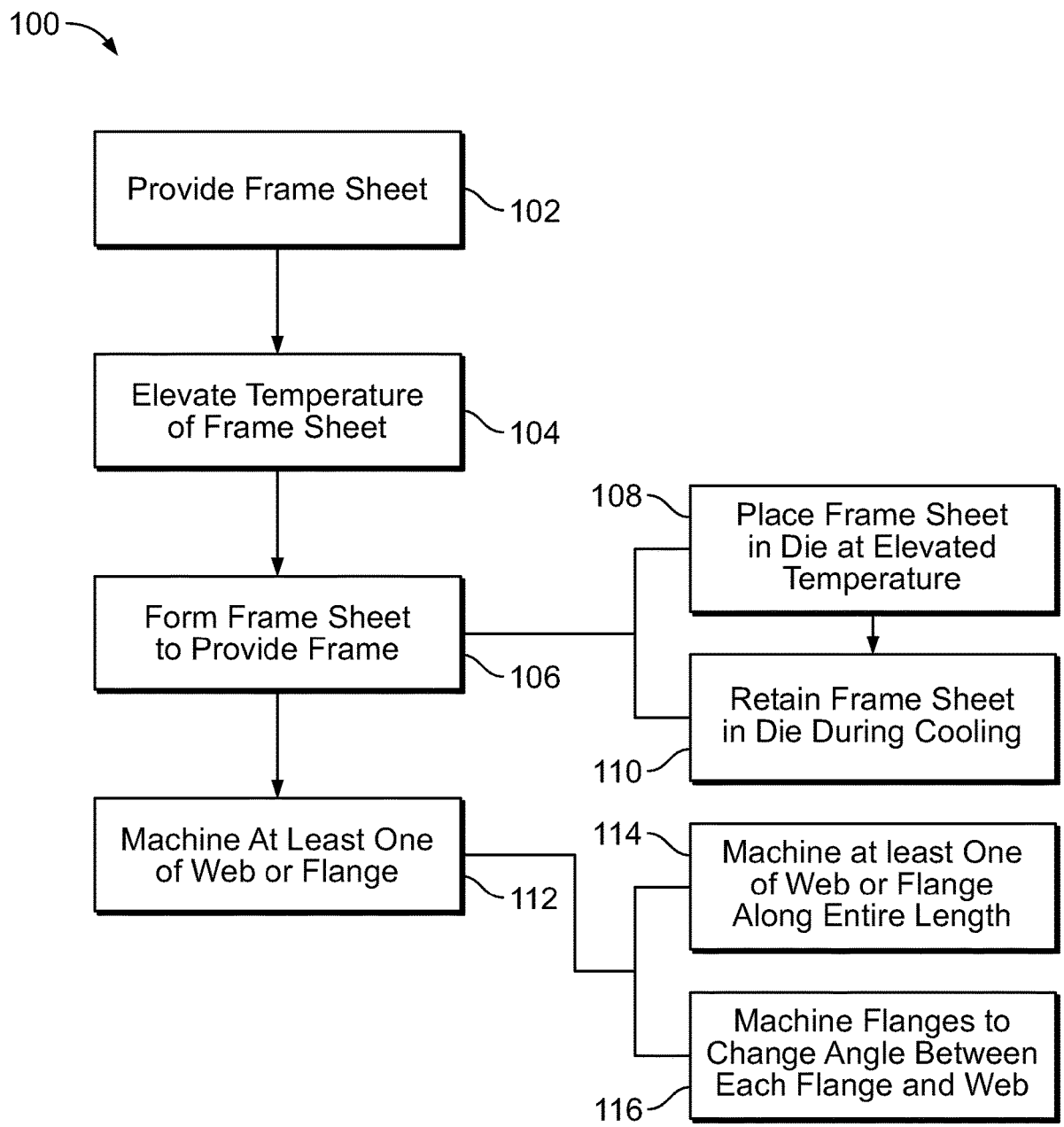
FIG. 1 is a flowchart of a method, according to an embodiment of the present disclosure, according to an embodiment of the present disclosure.

FIG. 1 provides a flowchart of a method 100 (e.g., for providing a frame structure, for example for use in assembling an aircraft), in accordance with various embodiments. The method 100, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion.

At 102, a frame sheet is provided. FIG. 2 provides a plan view of an example frame sheet 200, and FIG. 3 provides a side view. The depicted frame sheet 200 includes a central opening 202 surrounded by four side portions 204. As seen in FIG. 2, the example frame sheet 200 defines an open, rectangular shape, with an overall rectangular footprint surrounding the central opening 202. The side portions 204 extend continuously about a perimeter of the central opening 202. As seen in FIG. 3, the depicted example frame sheet 200 has a substantially flat, uniform cross section (e.g., the frame sheet 200 is flat and uniform within a predetermined tolerance). It is noted that the tolerance may vary by application, for example, based on the area and/or thickness of the frame sheet 200. For example, the tolerance may be specified by a supplier of the sheet and/or an industry standard. As one example, the tolerance for sheets between 0.065 inches and 0.249 inches may be ⅛ inch over lengths of 2 feet or less, 3/16 inch over lengths between 2 and 3 feet, 5/16 inch over lengths between 3 and 4 feet, ⅜ inch over lengths between 4 and 6 feet, or ½ inch over lengths over 6 feet. The frame sheet 200 may have a relatively small thickness 206. The frame sheet 200, for example, may be made of an aluminum alloy and acquired in a readily available thickness. The frame sheet 200 in some embodiments is initially formed as a solid quadrangle, with material removed to form the central opening 202. It is noted that, while the illustrated frame sheet 200 defines a generally continuous rectangular shape, other shapes may be employed in alternate embodiments. Further, it is noted that frames may be sectioned in various embodiments, with separate frame portions formed and later joined to form a single frame. For example, as frame size increases, the costs of stamping dies or other tooling may increase. Accordingly, smaller frame sections or sub-portions may be formed and later joined to form a single frame.

At 104, a temperature of the frame sheet is elevated to at or above an elevated target temperature. As used herein, an elevated target temperature may be understood as a temperature that is higher than room temperature, a temperature that is higher than a temperature at which the frame sheet was initially stored, and/or a temperature that is higher than a designated operating temperature (or range of temperatures) at which the frame sheet will be subjected to in use after forming into a frame component. The frame sheet, for example, may be heated in a furnace, either individually, or with other frame sheets (and/or other components). Elevating the temperature of the frame sheet in various embodiments improves the formability of the frame sheet and/or helps provide improved properties from heat treating of a frame component formed with the frame sheet (e.g., by heating and quenching). Accordingly, the elevated target temperature may be selected to enhance formability of the frame sheet and/or mechanical properties of the frame. In some embodiments, the elevated target temperature may be selected to ensure that the frame sheet reaches a temperature at which mechanical properties may be improved by heating and quenching. For example, the elevated target temperature may be at or above a solution treating temperature of the frame sheet (e.g., the nominal solution treating temperature of an alloy from which the frame sheet is constructed), or at or above an upper critical temperature of the frame sheet (e.g., the nominal upper critical temperature of an alloy from which the frame sheet is constructed).

At 106, the frame sheet is formed to provide a frame. For example, the frame sheet may be placed in a die to be bent or otherwise formed to a predetermined shape. The frame defines a web and at least one flange. The frame sheet in the illustrated example is formed at or above the elevated target temperature (e.g., the frame sheet is at or above the elevated target temperature when the forming step begins). It is noted that the temperature at which the frame sheet is formed to provide the frame may be at the temperature to which the frame sheet was heated at 104, or may be at a different temperature. For example, the frame sheet may cool within an allowable range between the heating and forming steps. In some embodiments, the frame sheet is heated to a predetermined temperature above a target temperature, and cools between the heating and forming processes, while staying or being maintained at or above the target temperature for at least the beginning of the forming process.

Figure 4:
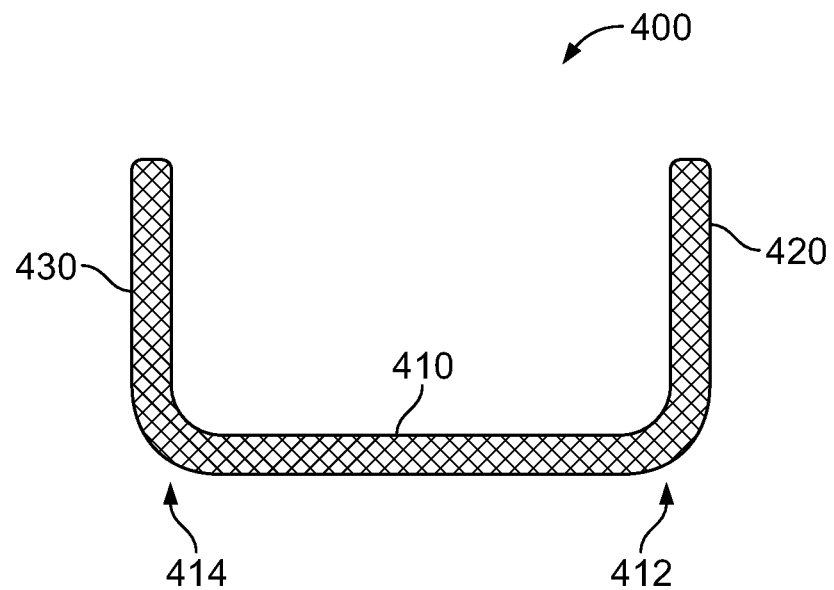
FIG. 4 depicts a cross section of a frame formed from the frame sheet of FIG. 2, according to an embodiment of the present disclosure.

As mentioned above, the frame provided by the forming process defines a web and at least one flange. In some embodiments more than one flange is provided. For example, in the illustrated embodiment, the frame is formed to include a first flange and a second flange extending from opposite ends of the web. FIG. 4 provides a cross section of an example frame 400 formed from the example frame sheet 200 of FIGS. 2-3, with the cross-section taken along lines 4-4 in FIG. 5, which shows an overhead perspective view of the frame 400. As seen in FIG. 4, the depicted frame 400 includes a web 410, a first flange 420, and a second flange 430. The first flange 420 extends from a first end 412 of the web 410, and the second flange 430 extends from a second end 414 of the web 410. The first end 412 and second end 414 of the web 410 are opposite each other. The first flange 420 and the second flange 430 extend in generally the same direction, defining a cross-sectional shape that includes two substantially parallel portions joined at respective ends by an intermediate portion. Other cross-sectional shapes may be defined in other embodiments. For example, a first portion may be connected to a second portion that is substantially perpendicular to the first portion. Or, as another example, two substantially parallel members may be joined at opposite ends by an intermediate portion. In the illustrated embodiment, the web 410, first flange 420, and second flange 430 are substantially flat, but it is noted that in other embodiments one or more of a web or flange may be formed with ridges, corrugations, or other features.

To form the frame 400, the frame sheet 200 may be placed in a die, with various portions bent or otherwise formed to provide the web, flange(s), and/or other features. For example, as best seen in FIG. 2, the example frame sheet 200 includes an interior portion 210 located along a periphery 212 surrounding the central opening 202. The interior portion 210 of the frame sheet 200 in the illustrated example is bent upward to form the first flange 420 of the frame 400. The example frame sheet 200 also includes an exterior portion 220 located along a periphery 222 surrounding the exterior of the frame sheet 200. The exterior portion 220 of the frame sheet 200 is bent upward to form the second flange 430 of the frame 400. The depicted frame sheet 200 also includes a middle portion 230 that is interposed between the interior portion 210 and the exterior portion 220. The middle portion 230 of the frame sheet 200 forms the web 410 of the frame 400 in the example illustrated in FIGS. 2-4. Forming the frame 400 in this manner allows use of a substantially thinner sheet of metal than would be possible if the frame 400 were machined from a solid block, thereby reducing machining time as well as reducing wasted material.

In various examples, conventional approaches may require frame sheets having a thickness of approximately 1-1.5 inches, whereas embodiments of the present disclosure may utilize frame sheets having a thickness between about 0.125 to 0.2 inches. For instance, in one example including a frame having outer dimensions of 48 inches×46 inches, with a 1.5 inch flange height, machining from a solid block requires an approximately 1.5 inch thick plate weighing about 330 pounds and requiring a substantial amount of machining time (e.g., 4 hours or more). In contrast, an example embodiment of the present disclosure can provide a similar frame using an approximately 0.19 inch plate weighing about 40 pounds and requiring substantially less machining time (e.g., about 0.5 hours of machining time), thereby saving about 290 pounds of material and a large amount of machining time. In another example, including a frame having outer dimensions of 38 inches×34 inches, with a 1.25 inch flange height, machining from a solid block requires an approximately 1.25 inch thick plate weighing about 160 pounds and requiring a substantial amount of machining time (e.g., 4 hours or more). In contrast, an example embodiment of the present disclosure can provide a similar frame using an approximately 0.16 inch plate weighing about 20 pounds and requiring substantially less machining time (e.g., about 0.5 hours of machining time), thereby saving about 290 pounds of material and a large amount of machining time. It is noted that these are provided by way of non-limiting example for illustrative purposes, and that other sizes, shapes, or types of frames may be utilized in other embodiments.

Figure 5:
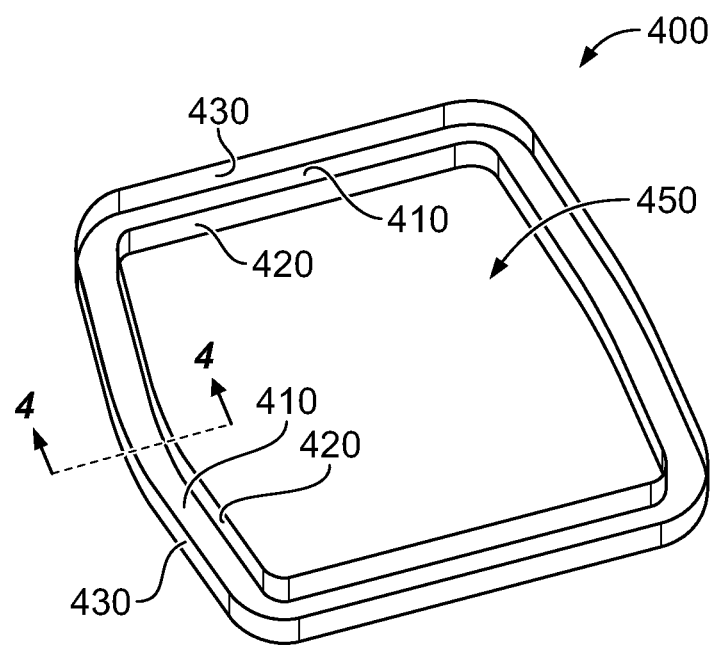
FIG. 5 depicts an overhead perspective view of the frame of FIG. 4.

FIG. 5 provides an overhead perspective view of the frame 400. As seen in FIG. 5, the web 410, first flange 420, and second flange 430 extend along the perimeter or circumference of the frame 400. The frame 400 defines a central frame opening 450 corresponding to the central opening 202 of the frame sheet 200 from which the frame 400 was formed. In some embodiments, the frame 400 may be used as part of a frame assembly for an aircraft, with the frame 400 joined to additional frames 400 and/or other components to define the frame assembly for the aircraft. Accordingly, portions of the frame 400 may correspond to portions of an aircraft in various embodiments. For example, the first flange 420 may correspond to an inner mold line, the second flange 430 may correspond to an outer mold line, and the central frame opening 450 may correspond to an interior of the aircraft.

It is noted that the temperature of the frame sheet 200 can change during a forming process of the frame 400. The frame 400 may be cooled during forming from the initial temperature at or above the target temperature. For example, in the illustrated embodiment, at 108, the frame sheet is placed in a die at an elevated temperature (e.g., at or above the elevated target temperature). Then, at 110, as the die is closed or engaged with the frame sheet to form the frame (e.g., using a press), the frame sheet is retained in the die during cooling, or while the frame that has been formed from the frame sheet is cooled. The frame may be retained in the die for a predetermined amount of time and/or until the frame reaches a predetermined temperature to help ensure proper forming or desired mechanical properties. For example, the predetermined temperature and/or predetermined time during which the frame is held in the die may be selected to help reduce springback and/or otherwise improve the accuracy of the frame produced by the forming process. In various embodiments, the frame is quenched by contact with the die to enhance mechanical properties.

Returning to FIG. 1, at 112, at least one of the web or the at least one flange is machined to reduce a thickness of at least one of the web or the at least one flange. For example, the frame may be cooled to a desired temperature before machining, removed from the die, and then machined to achieve a final desired shape. Machining from a formed shape as discussed herein results in less machining required compared to machining from a solid block, reducing the amount of waste material as well as cost of machining.

As discussed above, at least one of a web or flange is machined to reduce a thickness of the at least one web or flange. Additionally, machining may be used to alter a cross-sectional shape of the frame and/or achieve a target cross-sectional shape of the frame. In some embodiments, both a web and at least one flange are machined. For example, in an example depicted in FIG. 6, the web and both flanges are machined.

Figure 6:
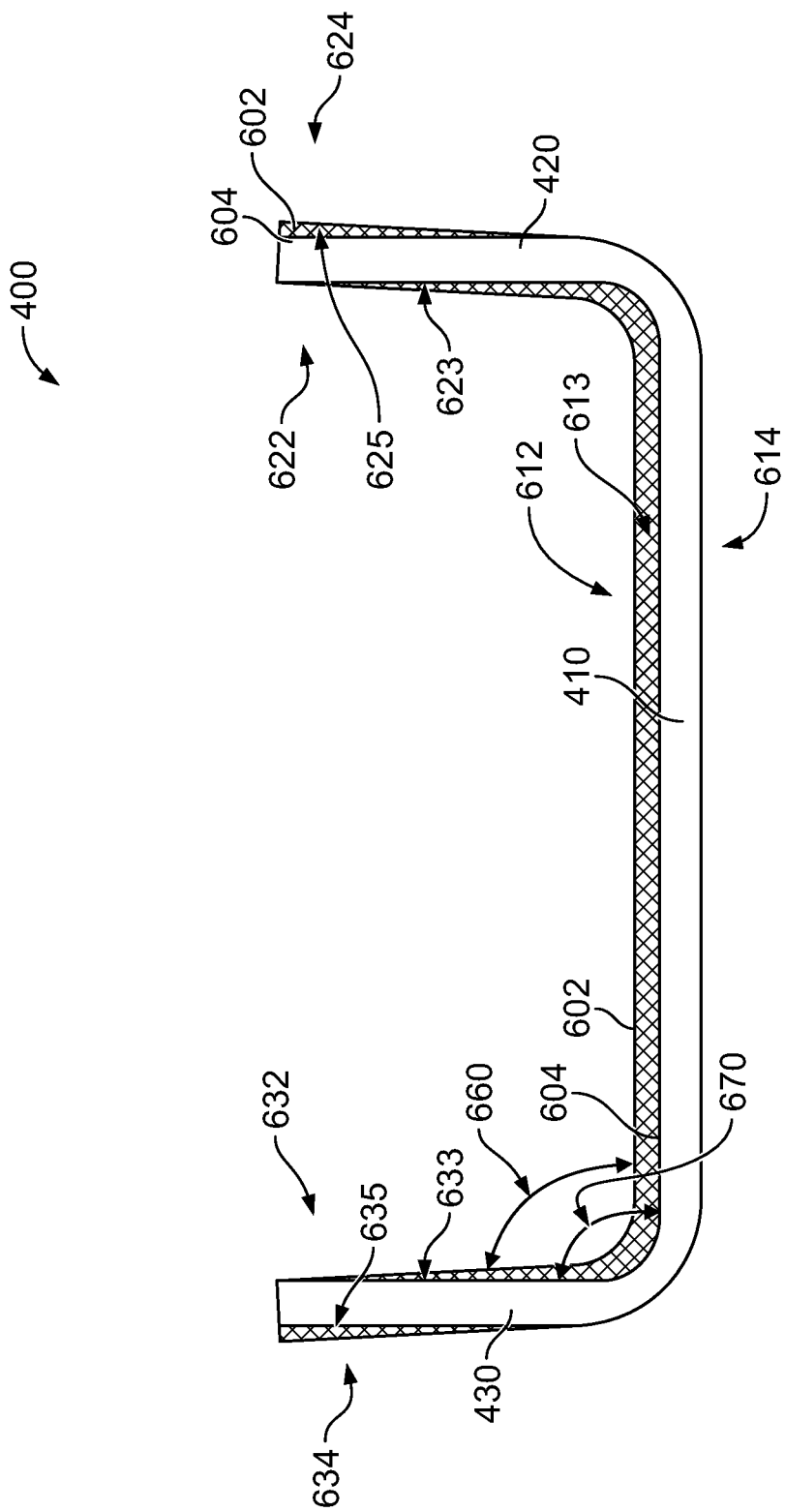
FIG. 6 depicts a cross sectional view of the frame of FIG. 4 before and after machining.

As depicted in FIG. 6, an initial frame outline 602 of the example frame 400 depicted in FIG. 6 is reduced to a final frame outline 604. The frame 400 includes a web 410, a first flange 420, and a second flange 430, with the first flange 420 and second flange 430 located at opposite ends of the web 410. The web 410 has an upper surface 612 and a lower surface 614. In the illustrated example, the upper surface 612 is machined to remove material 613 (removed material 613 shown in cross-hatching). The lower surface 614 in the example is not machined but instead provides a surface used to locate and secure the frame 400 in a desired position during machining. The lower surface 614, for example, may be placed in contact with a fixture during machining of the frame 400.

The first flange 420 has an inner side 622 and an outer side 624. In the illustrated example, material 623 is removed (removed material 623 shown in cross-hatching) from the inner side 622 and material 625 is removed (removed material 625 shown in cross-hatching) from the outer side 624 to achieve a desired final shape. Similarly, the second flange 430 has an inner side 632 and an outer side 634, with material 633 removed (removed material 633 shown in cross-hatching) from the inner side 632, and material 635 removed (removed material 635 shown in cross-hatching) from the outer side 634 to achieve the desired final shape. Accordingly, in the illustrated example, the machining process includes machining both sides of the flanges. By securing the frame 400 in position along the lower surface 614 of the web 410, material may be removed from multiple portions of the frame efficiently and accurately. In an example, the web 410, first flange 420, and/or second flange 430 are machined to reduce the thickness of the web 410, first flange 420, and/or second flange 430 down to less than a predetermined threshold thickness. In an example, the predetermined threshold thickness is selected based on expected moment, shear, and/or tension loads to be experienced by the frame.

Figure 7:
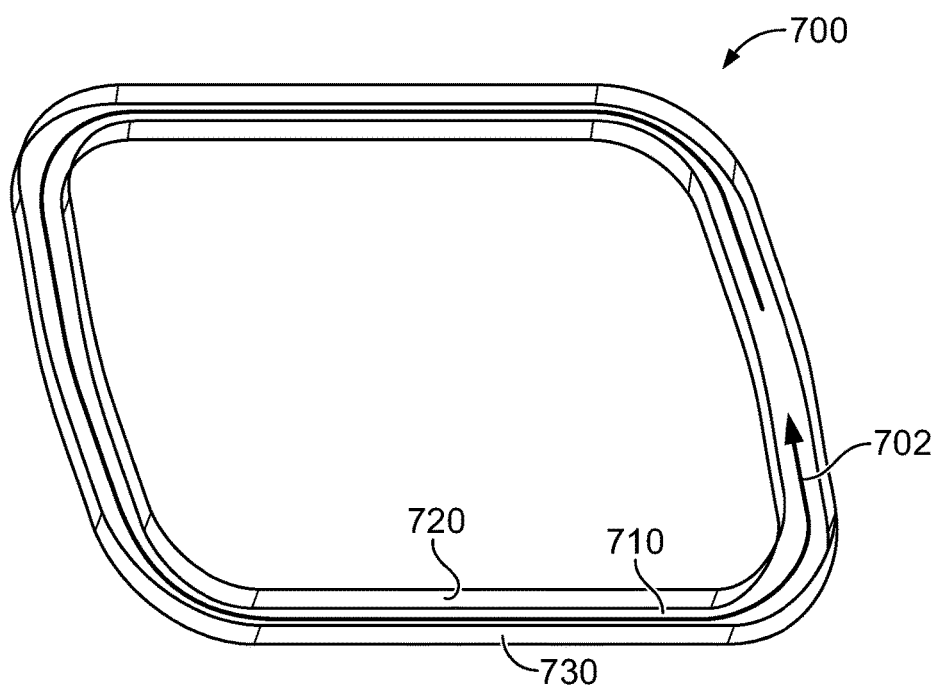
FIG. 7 depicts an overhead perspective view of a frame, according to an embodiment of the present disclosure.

With continued to reference to FIG. 1, in the illustrated example, at 114, at least one of the web or the at least one flange is machined along an entire length of the web and/or flange. It is noted that in some embodiments, the length may extend along a straight line. In other embodiments, the length may extend along a curve or perimeter. For example, the length may be a circumferential length. FIG. 7 illustrates a perspective overhead view of a frame 700 that has a circumferential length 702 extending along a perimeter of an open rectangular shape defined by the frame 700. The frame 700 in various embodiments corresponds to or incorporates aspects of the frame 400 after machining. In the illustrated example, the web 710, first flange 720, and second flange 730 are all machined along the entire circumferential length 702 of the frame 700.

It is noted that machining and forming processes may be used to provide variability of the geometry along the length of the frame 400 (e.g., variability of cross-sectional shape and/or size along the length). For example, the cross section may be varied to be optimized based on required or expected moment, shear, and tension loads to be experienced by the frame. In an example, the variability of cross-sectional shape of frame 400 and/or size along the length of frame 400 is selected based on expected moment, shear, and/or tension loads to be experienced by the frame 400. In some embodiments, frame section width may be varied by the die stamp tooling, and/or the thickness of the flange(s) and/or web may be varied by machining.

At 116 of the illustrated embodiment, the flanges are machined to change a corresponding angle between each flange and the web. The web (e.g., upper surface of the web) may also be machined to help achieve the change in angle. For example, as seen in FIG. 6, an initial angle 660 is formed between the second flange 430 and the web 410 for the initial frame outline 602, which is the outline of the frame 400 before machining. After machining, with the frame 400 having the final frame outline 604, a final angle 670 is defined between the second flange 430 and the web 410, with the final angle 670 different from the initial angle 660. The angle between the first flange 420 and the web 410 may be similarly altered during the machining process. It is noted that the difference between the initial angle 660 and the final angle 670 may be relatively small (e.g., one or two degrees). The initial angle 660 may be selected to provide a sufficient amount of draft to be able to remove the frame from the die. In various embodiments, the initial angle may be selected for improving removability from a die, and the final angle selected based on the desired design of the frame produced. For example, the final angle may be difficult or impractical to achieve as part of a forming process (e.g., due to difficulty in removing the frame from a die). Accordingly, machining may be employed to achieve the desired final angle. In various embodiments, use of the forming process in combination with machining in various examples reduces the overall material waste while allowing for complex or difficult shapes or angles to be achieved.

Figure 8:
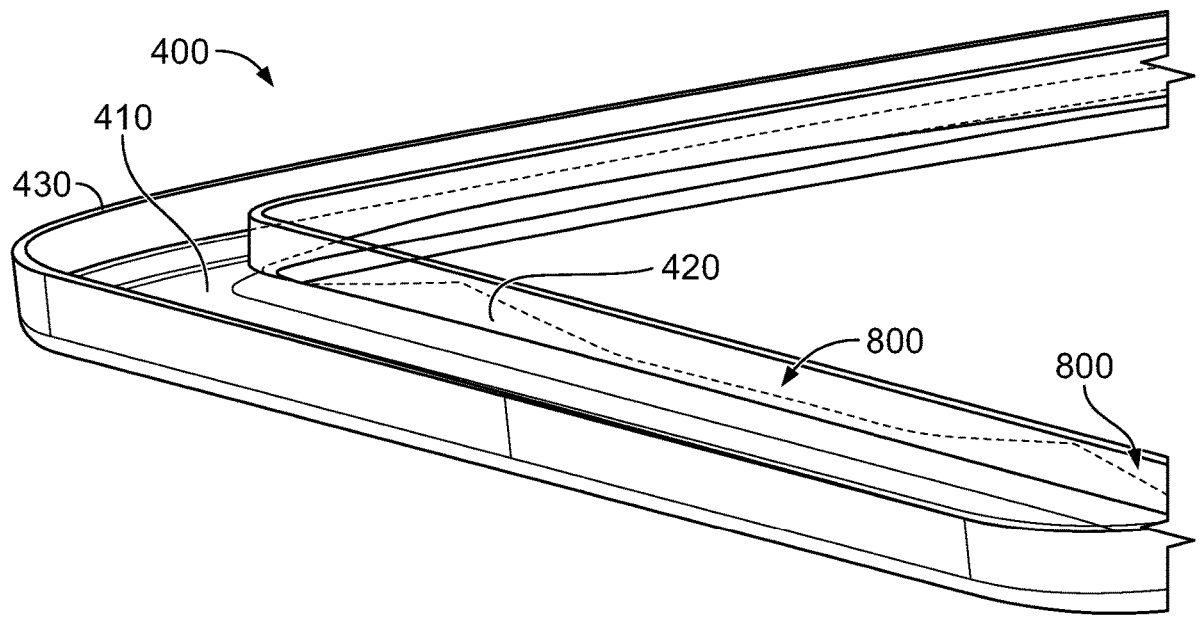
FIG. 8 depicts an enlarged view of an example of the frame of FIG. 4 in which a flange has notches along its length, according to an embodiment of the present disclosure.

It is noted that, in some embodiments as discussed herein machining may be performed along an entire length of a web and/or one or more flanges. Additionally or alternatively, machining or other processes may be performed which are not performed along the entire length. For example, notches or other features may be formed along portions of the length of a web and/or flange. As one example, FIG. 8 depicts an enlarged view of an example of a frame 400 in which first flange 420 has notches 800 along its length. Accordingly, in the illustrated example, the first flange 420 has a variable height along its length. In contrast, the depicted second flange 430 in the example has a constant height along its length.

Various sizes and shapes of frames may be provided in various embodiments. For example, in some embodiments, a frame may be provided having a ratio between flange height (e.g., second flange 430) to flange thickness of between about 5:1 and 12:1. As one example, a frame having a 1.5 inch flange height and a 0.1875 inch flange thickness has a ratio of 8:1.

As another example, in various embodiments a frame is provided that has a ratio between width between flanges (e.g., first flange 420 and second flange 430) and maximum flange height between 2:1 and 6:1. As one example, a frame 400 of the example depicted in FIG. 6 may have a ratio of about 2.5:1. Again, it is noted that specific dimensions of particular examples provided herein are for illustrative purposes, and that other dimensions may be utilized in other embodiments.

Figure 9:
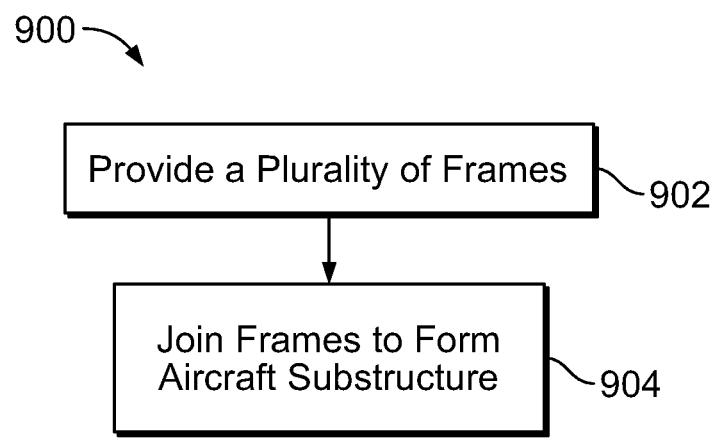
FIG. 9 is a flowchart of a method, according to an embodiment of the present disclosure.

As discussed herein, in some embodiments, a frame provided as discussed herein may be used as part of a frame assembly (e.g. aircraft substructure) for an aircraft, with the frame joined to additional frames and/or other components to define the frame assembly for the aircraft. FIG. 9 provides a flowchart of a method 900 (e.g., for providing a frame assembly for use in assembling an aircraft), in accordance with various embodiments. The method 900, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion.

At 902, a plurality of frames are provided. One or more of the frames in the illustrated example are provided using all or a portion of the method described in connection with FIG. 1. For example, for a given frame, a frame sheet may be initially provided. The temperature of the frame sheet may then be elevated to an elevated target temperature. Then, at the elevated target temperature, the frame sheet is formed to provide a frame defining a web and at least one flange. Then, at least one of the web or the at least one flange is machined to reduce a thickness of the at least one of the web or the at least one flange.

Figure 10:
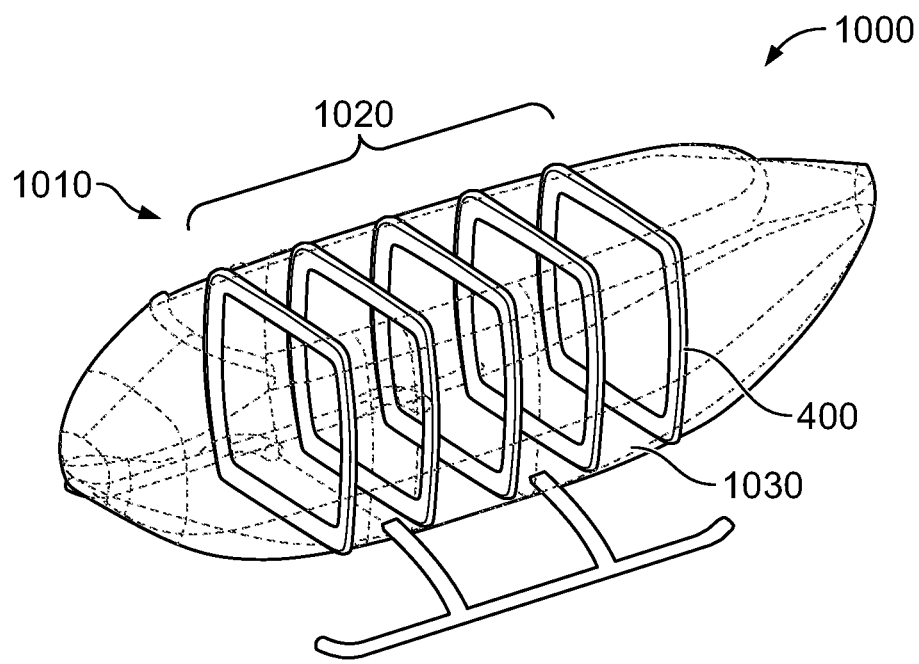
FIG. 10 depicts a perspective view of a frame assembly, according to an embodiment of the present disclosure.

At 904, the plurality of frames are joined to form an aircraft substructure. For example, FIG. 10 depicts an example aircraft 1000 (e.g., UAV, helicopter, airplane) having an aircraft substructure 1010 formed from a plurality 1020 of frames including individual frames 400 with the individual frames 400 provided as discussed herein. It is noted that the frames may be joined indirectly, or by means of other structures. For example, the frames may be joined by a shell or fuselage 1030 of the aircraft 1000. Additional support members or structures (not shown in FIG. 10 for clarity of illustration) may also be used in various embodiments. It is be noted that the frames 400 used in the aircraft substructure 1010 may be identically sized and shaped, or as another example, some frames may have differing sizes or shapes, for example to provide a tapered profile or other desired profile for the aircraft defined by the frame assembly, and/or to address differing loads encountered at different portions of the aircraft. It is noted that other frame shapes or frame assemblies may be utilized in alternate embodiments. For example, one or more frames may be used to form a wing rib structure.

Accordingly, various embodiments allow for improved manufacture of frames and/or frame assemblies, including improved accuracy, reduced machining time, and/or reduced wasted material. It is noted that various embodiments may be particularly suited for providing light weight frames for use with aircraft. Various embodiments provide improved speed of manufacturing frames as well as reduced cost of manufacturing frames relative to conventional manufacturing approaches, for example, for small aircraft such as UAV's.

Figure 11:
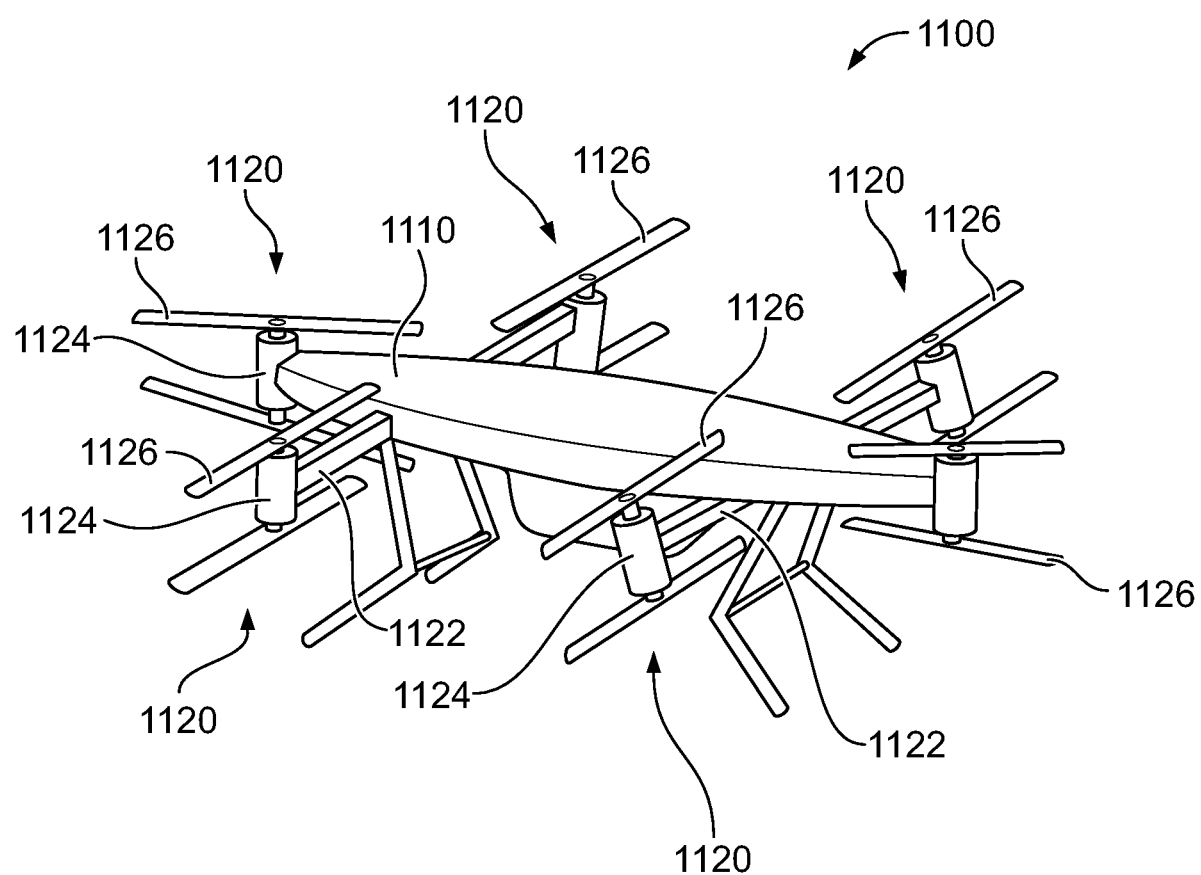
FIG. 11 is a top perspective view of an aircraft, according to an embodiment of the present disclosure.

FIG. 11 is a top perspective view of an aircraft, according to an embodiment of the present disclosure. In the illustrated embodiment, the aircraft is configured as a UAV 1100. In other embodiments, other types of aircraft or other types of vehicles may be utilized. In the depicted example, the UAV 1100 includes an airframe 1110 and a plurality of propulsion systems 1120 coupled to the airframe 1110. The depicted airframe 1110 is an aircraft substructure (e.g., aircraft substructure 1010) that is formed from a group (e.g., plurality 1020) of frames including a plurality of individual frames (e.g., individual frames 400).

In general, the airframe 1110 forms the structural body or framework for the UAV 1100. In various embodiments, the airframe 1110 is utilized to mount various components, such as, for example, a plurality of individual UAV propulsion systems 1120. In the illustrated embodiment shown in FIG. 11, the UAV 1100 includes six propulsion systems 1120 (other numbers of propulsion systems 1120 may be utilized in other embodiments), at least some of which are coupled to the airframe 1110 via a corresponding arm 1122. It is noted that some or all of the propulsion systems 1120 in various embodiments may be directly mounted to the airframe 1110.

In the depicted example, each propulsion system 1120 incudes a motor assembly 1124 that drives two corresponding rotors 1126. In other embodiments, each propulsion system 1120 may include a single rotor 1126. The motor assembly 1124 includes a motor and a motor controller. The motor of each motor assembly 1124 is configured to drive the corresponding rotors 1126. The motor controller may be referred to as an electronic speed controller (ESC) that is configured to provide power to the motor and thus control the operational speed of the motor.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method comprising: providing a frame sheet including an interior portion located around a first periphery surrounding a central opening, an exterior portion located along a second periphery surrounding an exterior of the frame sheet, and a middle portion interposed between the interior portion and the exterior portion; elevating a temperature of the frame sheet to at or above an elevated target temperature; at or above the elevated target temperature, forming the frame sheet to provide a frame defining a web, a first flange extending from a first end of the web, and a second flange extending from a second end of the web, wherein the first end is opposite from the second end, wherein said forming comprises bending the interior portion upward to form the first flange, bending the exterior portion upward to form the second flange, and forming the web from the middle portion; and after said forming, machining at least one of the web, the first flange, or the second flange to reduce a thickness of the at least one of the web, the first flange, or the second flange; wherein the machining comprises machining along both sides of the first flange and the second flange.

2. The method of claim 1, wherein the frame sheet defines an open rectangular shape.

3. The method of claim 1, wherein the frame sheet has a substantially flat, uniform cross section.

4. The method of claim 1, wherein the elevated target temperature is at or above a solution treating temperature of the frame sheet.

5. The method of claim 1, wherein said forming the frame sheet to provide the frame comprises placing the frame sheet in a die at the elevated target temperature, and retaining the frame sheet in the die while the frame is cooled.

6. The method of claim 1, further comprising machining the first flange and the second flange to change a corresponding angle between each of the first flange, the second flange, and the web.

7. The method of claim 1, wherein said forming further comprises forming the first flange to be parallel with the second flange.

8. The method of claim 1, wherein said machining the at least one of the web, the first flange, or the second flange comprises machining at least one of the web, the first flange, or the second flange along an entire length of the at least one of the web, the first flange, or the second flange.

9. The method of claim 8, wherein the at least one of the web, the first flange, or the second flange is machined along a circumferential length.

10. A method comprising: providing a plurality of frames, wherein providing each frame comprises: providing a frame sheet including an interior portion located around a first periphery surrounding a central opening, an exterior portion located along a second periphery surrounding an exterior of the frame sheet, and a middle portion interposed between the interior portion and the exterior portion; elevating a temperature of the frame sheet to at or above an elevated target temperature; forming, at or above the elevated target temperature, the frame sheet to provide a frame defining a web, a first flange extending from a first end of the web, and a second flange extending from a second end of the web, wherein the first end is opposite from the second end, wherein said forming comprises bending the interior portion upward to form the first flange, bending the exterior portion upward to form the second flange, and forming the web from the middle portion; and after said forming, machining at least one of the web, the first flange, or the second flange to reduce a thickness of the at least one of the web, the first flange, or the second flange; and joining the plurality of frames to form an aircraft substructure of an aircraft; wherein the machining comprises machining along both sides of the first flange and the second flange.

11. The method of claim 10, wherein the frame sheet defines an open rectangular shape corresponding to an interior of the aircraft.

12. The method of claim 10, wherein the frame sheet has a substantially flat, uniform cross section.

13. The method of claim 10, wherein the elevated temperature is at or above a solution treating temperature of the frame sheet.

14. The method of claim 10, wherein said forming the frame sheet to provide the frame comprises placing the frame sheet in a die at the elevated temperature, and retaining the frame sheet in the die while the frame is cooled.

15. The method of claim 10, wherein said forming further comprises forming the first flange to be parallel with the second flange.

16. The method of claim 10, further comprising joining the plurality of frames to form an aircraft substructure of an aircraft.

17. The method of claim 10, wherein said machining the at least one of the web, the first flange, or the second flange comprises machining at least one of the web, the first flange, or the second flange along an entire length of the at least one of the web, thw first flange, or the second flange.

18. The method of claim 17, wherein the at least one of the web, the first flange, or the second flange is machined along a circumferential length.

19. The method of claim 10, the first flange corresponding to an inner mold line of the aircraft and the second flange corresponding to an outer mold line of the aircraft.

20. The method of claim 19, further comprising machining the first flange and the second flange to change a corresponding angle between the first flange, the second flange, and the web.

21. A method comprising: providing a frame sheet including an interior portion located around a first periphery surrounding a central opening, an exterior portion located along a second periphery surrounding an exterior of the frame sheet, and a middle portion interposed between the interior portion and the exterior portion; elevating a temperature of the frame sheet to at or above an elevated target temperature; at or above the elevated target temperature, forming the frame sheet to provide a frame defining a web, a first flange extending from a first end of the web, and a second flange extending from a second end of the web, wherein the first end is opposite from the second end, wherein said forming comprises bending the interior portion upward to form the first flange, bending the exterior portion upward to form the second flange, and forming the web from the middle portion; and after said forming, machining at least one of the web, the first flange, or the second flange to reduce a thickness of the at least one of the web, the first flange, or the second flange; wherein said forming the frame sheet to provide the frame comprises placing the frame sheet in a die at the elevated target temperature, and retaining the frame sheet in the die while the frame is cooled; wherein said machining the at least one of the web, the first flange, or the second flange comprises machining at least one of the web, the first flange, or the second flange along an entire length of the at least one of the web, the first flange, or the second flange; and wherein the machining comprises machining along both sides of the first flange and the second flange.

* * * * *